US006974502B2

(12) United States Patent
Schmidt

(10) Patent No.: US 6,974,502 B2
(45) Date of Patent: Dec. 13, 2005

(54) COATING CHAMBER AND TEMPLATES TO PRODUCE DECORATIVE MOULDINGS

(75) Inventor: David Schmidt, Fenwick (CA)

(73) Assignee: Santo P. Rapone, St. Catharines (CA)

( * ) Notice: Subject to any disclaimer, the term of this patent is extended or adjusted under 35 U.S.C. 154(b) by 0 days.

(21) Appl. No.: 10/964,742

(22) Filed: Oct. 15, 2004

(65) Prior Publication Data

US 2005/0229846 A1 Oct. 20, 2005

(30) Foreign Application Priority Data

Apr. 16, 2004 (CA) .................................. 2464595

(51) Int. Cl.[7] ................................................ B05C 5/02

(52) U.S. Cl. ....................... 118/410; 118/423; 118/427; 118/428

(58) Field of Search ........................ 118/410, 423, 427, 118/428; 425/112, 122, 127, 403.1, 182, 425/102

(56) References Cited

U.S. PATENT DOCUMENTS 3,663,493 A * 5/1972 Miller ....................... 523/220
6,544,454 B1 * 4/2003 Chen ..................... 264/171.13
6,592,668 B2 * 7/2003 Rao et al. ................... 118/410

* cited by examiner

*Primary Examiner*—Laura Edwards
(74) *Attorney, Agent, or Firm*—Riches, McKenzie & Herbert LLP

(57) ABSTRACT

A method and apparatus to impart a coating layer on the surface of decorative mouldings that are widely used in the externally insulated finishing systems (EIFS) in the construction industry. The method is a sequence of mechanically advancing a core, constructed from pre-formed expanded polystyrene (EPS, in a straight horizontal plane through a coating chamber/hopper with templates conforming to the desired decorative profile. The apparatus is a rectangular box with a funneled opening at the top with adjustable internal plates to direct the material from the sides of the box toward the pre-formed core that is being coated. Two plates on the bottom of the box support the pre-formed core and are adjustable to leave an opening in the center so that excess material can fall through the bottom after coating the last core. The templates are designed to be interchangeable with other coating apparatus designed by the inventor to produce start strips, decorative mouldings, wall panel sections and columns commonly used in the construction industry.

4 Claims, 6 Drawing Sheets

10
11
12
13
14
14a
14b
15
16
17
18
19
20
21

COATING CHAMBER AND TEMPLATES TO PRODUCE DECORATIVE MOULDINGS

FIELD OF THE INVENTION

This invention relates to the construction industry and is used to produce decorative mouldings comprised of preformed expanded polystyrene (hereinafter referred to as EPS) cores with a stucco/plaster/cement-like coating. The invention relates particularly to a method and apparatus for coating the cores with stucco/plaster/cement.

BACKGROUND OF THE INVENTION

The externally insulated finishing systems (hereinafter referred to as EIFS) construction basically consists of framing a building and covering the outside surface with a backboard that may be plywood, gypsum or cement board prior to attaching the exterior insulation and finish.

The exterior insulation consists of EPS sheets mechanically or adhesively attached to the backboard. The EPS sheets are then covered with one or two layers of cloth mesh and a base coat of stucco.

The base coat is either sprayed or trowelled on and finished smooth by hand with a float. A finish stucco material is then applied to give the desired decorative surface and colour.

Decorative mouldings are generally preformed and finished and are ready to be installed on the construction site. They are typically comprised of an expanded polystyrene (EPS) core and coated with a plaster or stucco-like material to provide an attractive decorative finished surface. To improve strength and durability, a fibre mesh can be applied to the core prior to coating.

The prevalent method of producing a decorative moulding is to align rows of the cores on plastic topped tables and staple or screw them to the tabletop. There could be as many as four rows of cores places side by side on a four feet wide table, extending up to ninety feet long or more. If required, the cores may have had mesh applied prior to placing them on the table.

The coating material is poured from a pail along the length of the cores and massaged by hand on to the exposed surfaces of the cores. A box, with a steel template cut to a finish profile, is then slid along the length of the table, thus imparting the finished profile on the workpiece. The workpiece is allowed to dry, and another coating can be applied with a finer grained material to impart a smoother finish.

After allowing the workpiece to completely dry, it is pried off the table. The edges that were defined by the tabletop can be sanded and any minor imperfections can be repaired.

This whole process usually takes twenty-four hours and requires clean up after of the tabletops, removal of the screws, cleaning the box and template. This method is very costly, in terms of labour and space.

More recently, various types of automated equipment have been produced to apply the coating. These basically involve pushing the pre-formed core through a coating chamber equipped with sides, bottom and entry and exit dies or templates. So far there has not been any manufacturer to offer a rationalized standard, off the shelf, range of templates or coating chamber/hopper to accommodate such a selection. No manufacturer has been able to provide templates that are adjustable to allow for the inevitable variation of the pre-formed core sizes. For example Canadian patent 2,229,933 published Aug. 19, 1999 discloses a method and apparatus for coating a decorative workpiece. This apparatus drives a core through a coating chamber with a pair of conveyor belts with spikes penetrating the core from the bottom surface. The core is driven through a pressurized coating chamber by the conveyor belts. An elongate channel or dovetail is pre-cut in the bottom of the core that engages on a corresponding rail on the apparatus, and holds the core against lateral and vertical movement as it is coated. While this method and apparatus does provide a coating on the decorative surface of the workpiece, in practise it can be very troublesome. If the cores are not tightly placed end to end with each other as they pass through the coating chamber, the coating material leaks on to the conveyor belts and rail. The leaked material can accumulate as lumps on the belts and impart an uneven finish on the workpiece. Furthermore, as the last core passes through the coating chamber, all the excess material falls onto the rail and spiked belts thus requiring a meticulous cleanup.

Additionally, the apparatus disclosed in Canadian patent 2,229,933 published Aug. 19, 1999 is extremely limited in its application in coating decorative inside corner mouldings. Also, an undesirable channel or dovetail is required on the underside of the core. Furthermore, because the ends of the coating chamber are angled, the templates are not easily produced because of the complicated rendering of the resulting perpendicular section required on the workpiece. Also, no method is disclosed to adjust the coating thickness other than the fixed sizes of the templates.

Canadian patent application 2184205 discloses a method and apparatus for manufacturing decorative mouldings. In this method, the workpiece is driven by conveyor belts abutting both sides of the workpiece before passing through a coating chamber while being slidingly engaged with a continuous flat tabletop. While this apparatus does provide a coating on the decorative surface of the workpiece, it is also troublesome and limited in its application. Firstly, if the cores are not tightly butted up against each other, end to end, the coating material leaks on to the tabletop, accumulates and affects the thickness of the coating. Holding the cores against the tabletop as they pass through the coating chamber creates friction that makes the cores harder to drive through the coating chamber. For inside corner mouldings, the conveyor belts can only drive against two corners on the sides of the core. The belts rip the corners of the core before entering the coating chamber. Slipping can occur which results in an uneven surface finish. Pieces of the core are carried into the coating chamber and contaminate the mix. The dies as illustrated in the patent with tapered openings having sharp inside corners are not easily achieved, except by hand grinding and filing, making them too costly. Additionally, the apparatus does not allow for adjusting the coating thickness other than the fixed sizes of the templates.

Therefore, there is a need to develop a method and apparatus for coating the cored workpieces that includes a coating chamber that accepts a standard range of templates, templates that adjust to allow control of the coating thickness and for size variations of the cores, a way to allow material to escape if the cores are not butted close enough to prevent leakage between subsequent cores as they pass through the coating chamber.

SUMMARY OF THE INVENTION

It is therefore an object of the present invention to provide a novel method and apparatus for applying a plaster/stucco-like coating material to the surfaces of an elongate foam core. The foam core is preformed with a profile resembling the desired finish surface profile and may or may not have a reinforcing mesh applied to its surface prior to coating.

The coated foam core can be used for decorative mouldings.

Accordingly, the present invention discloses a method for applying a plaster/stucco-like coating to the surfaces of an elongate foam core comprising the steps of:

Continuously advancing the core in a straight horizontal plane through a coating chamber.

Supporting the core, while inside a coating chamber, vertically with ledges that adjust to slide under the bottom sides by approximately one-half inch.

Advancing the core through an input template opening made of steel with an opening corresponding to the profile of the core and large enough to accommodate the core with enough clearance to allow the core to pass through the input template even if the core had been previously coated.

Advancing the core through an output template conforming to the desired finish profile. The core being preformed to a shape conforming to the desired profile but correspondingly smaller by an amount equal to the desired thickness of the coating.

Adjusting the input template vertically to minimize the space between the top of the core and the template opening.

Adjusting the output template vertically to provide the desired clearance between the top of the core and the template that corresponds to the desired coating thickness applied to the core.

Adjusting the overlapping output templates horizontally to provide a coating thickness corresponding to the actual size of the core.

Adjusting side hinged plates internal to the coating chamber to funnel the coating material to the sides of the core, thus eliminating dead space in the corners of the coating chamber where the coating material would otherwise stagnate.

Adjusting scrapers located between the bottom corners of the core and the output template as it exits the coating chamber to remove excess material from the bottom corners and to provide a sharp edge.

Filling the coating chamber with plastic/stucco-like material by first inserting the foam core so that the input and output template openings are filled with the core, and keeping the coating chamber filled as the cores advance through, one after the other.

A further object of the present invention is to provide an apparatus for applying a plaster/stucco-like coating material to the surface of a profiled elongate foam core, said apparatus comprising:

Means for providing a supporting bottom ledge, adjustable for different core sizes, opened at the center.

Means of adjusting the funneling of the coating material towards the sides of the core.

Means of imparting a surface profile on the core surface by the use of a coating chamber with input and output templates.

Means to allow attachment of a standardized input and output template.

Means to allow vertical adjustment of the templates.

Means to allow horizontal size adjustment of the output template opening.

Interchangeable coating chambers and templates usable on other apparatuses that produce decorative mouldings designed by the inventor.

Means of providing easy cleanout of the said coating chamber.

BRIEF DESCRIPTION OF THE DRAWINGS

FIG. 2*a* is a perspective view of a decorative moulding of the type used on exterior surfaces.

FIG. 2*b* is a perspective view of a decorative moulding of the type used on a plain flat moulding.

FIG. 2*c* is a perspective view of a decorative moulding of the type used on an interior inside corner.

FIG. 2*d* is a perspective view of a decorative moulding of the type used as a column that was made in two elongated halves and cemented together.

DETAILED DESCRIPTION OF THE PREFERRED EMBODIMENTS

Figure 1:
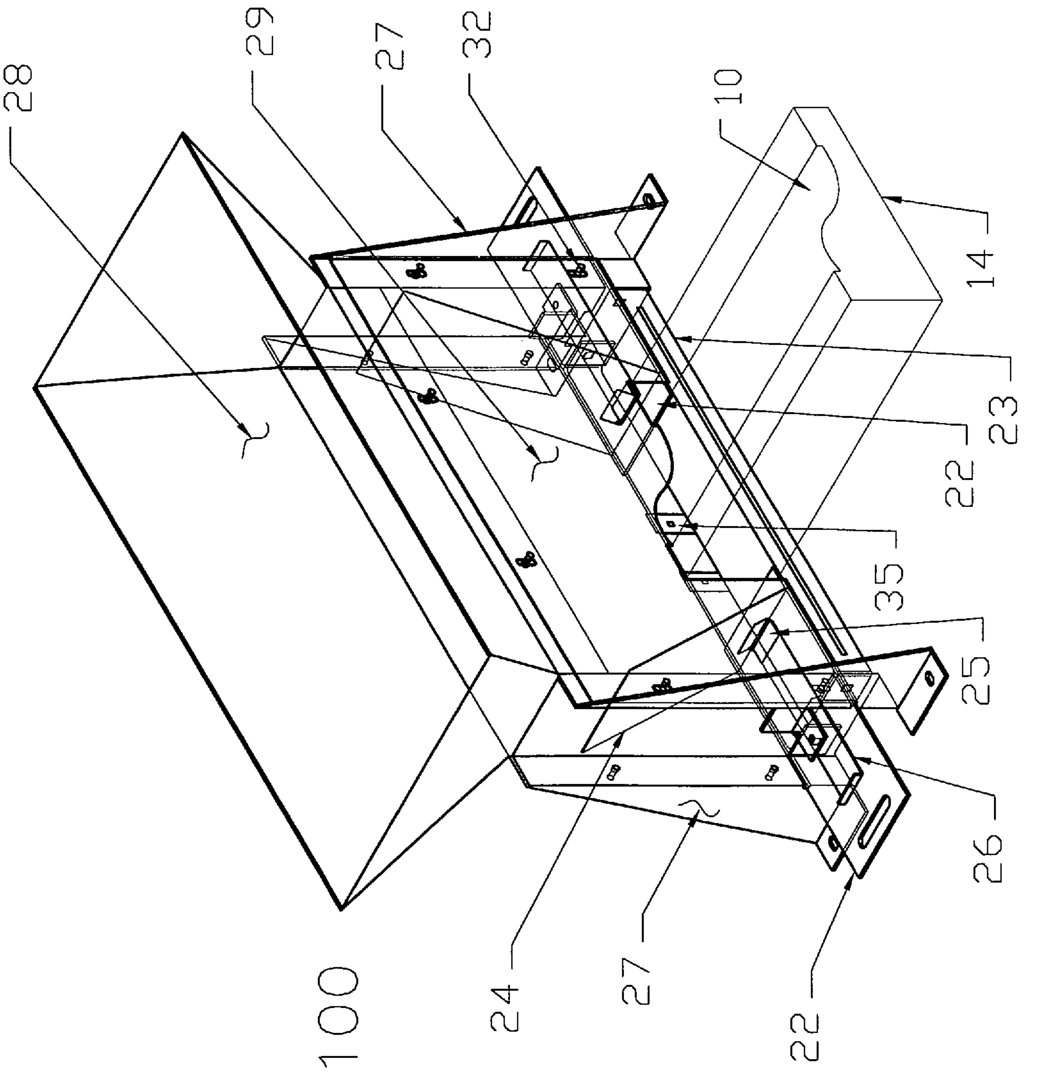
FIG. 1 is a perspective view of the apparatus of the present invention showing a decorative moulding core advancing through the machine. The core is shown in thin outline and transparent.
Figures 2A, 2B, 2C, 2D:
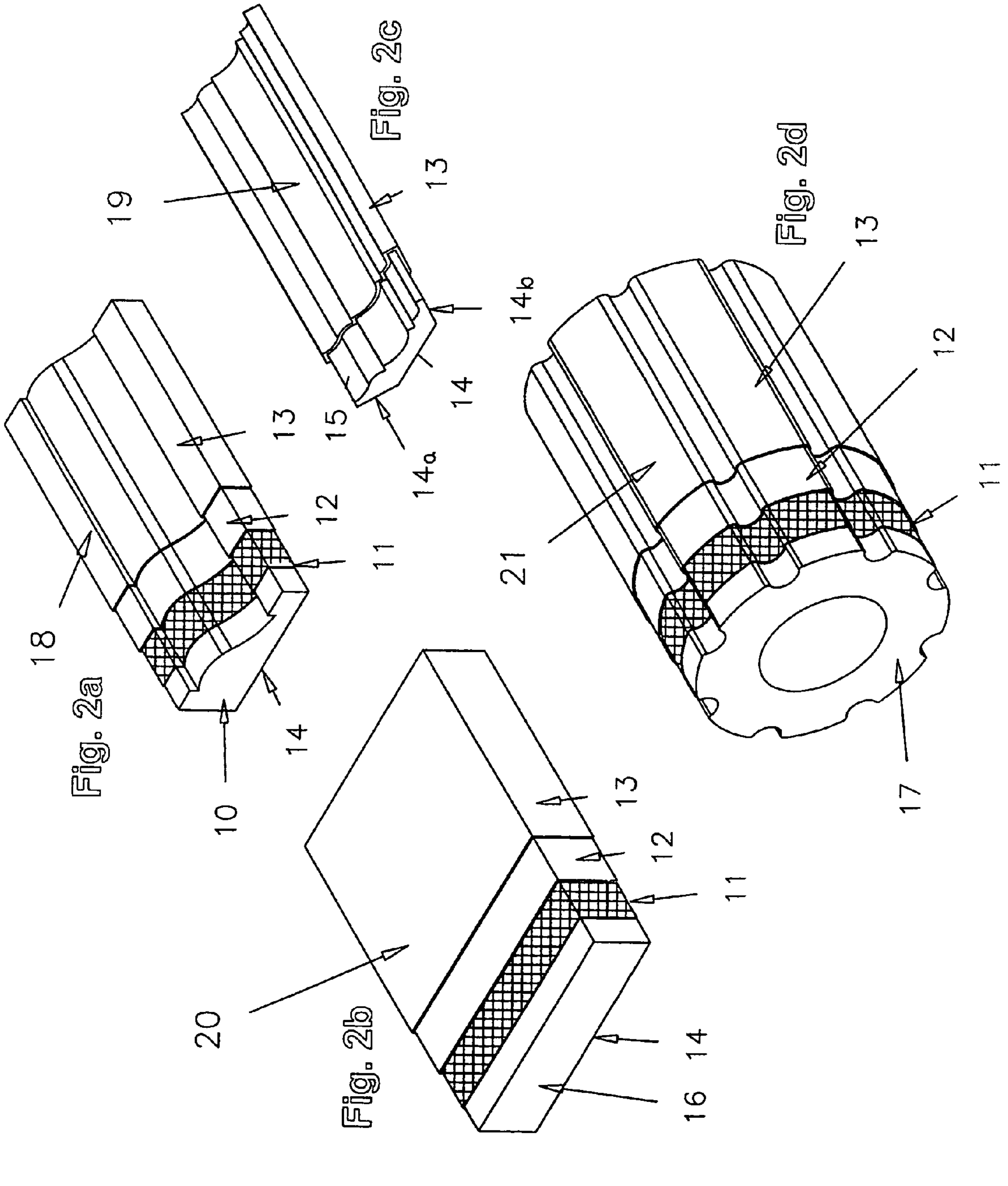
FIGS. 2*a* to 2*d* are perspective views of various decorative mouldings. The layers comprising the surfaces are shown staggered to reveal the core, mesh and one coating layer applied by the invention.

Referring to FIG. 1, there is illustrated apparatus 100 of the present invention in which a decorative moulding is coated. The workpiece comprises a core 10 (see FIG. 2) having coated surface 13 (see FIG. 2) which is profiled in cross-section, but elongated and consistent along its entire length. A mesh 11 (see FIG. 2) covers the surface 13 (see FIG. 2) before coating the workpiece and may overlap the sides to fold under on the surface 14 (see FIG. 2). The mesh acts as reinforcement to the workpiece but may be absent in mesh-less systems or advanced coatings with an inherent fibrous matrix.

The workpiece 18 is a decorative moulding designed to be mounted on an exterior wall by cementing it in place via bottom surface 14.

Workpiece 19 is an interior inside corner moulding and is attached by cementing surfaces 14*a* and 14*b* to a wall section.

Workpiece 20 is a wall panel.

Workpiece 21 is a column, which is produced by cementing together two halves after being coated and encircled around a beam structure.

Apparatus 100 as shown on figure is configured to take a decorative moulding core 10.

Referring to FIG. 1, core 10 is fed by means into the apparatus 100.

Referring to FIG. 1, core 10 advances under and into the coating chamber.

Figure 4:
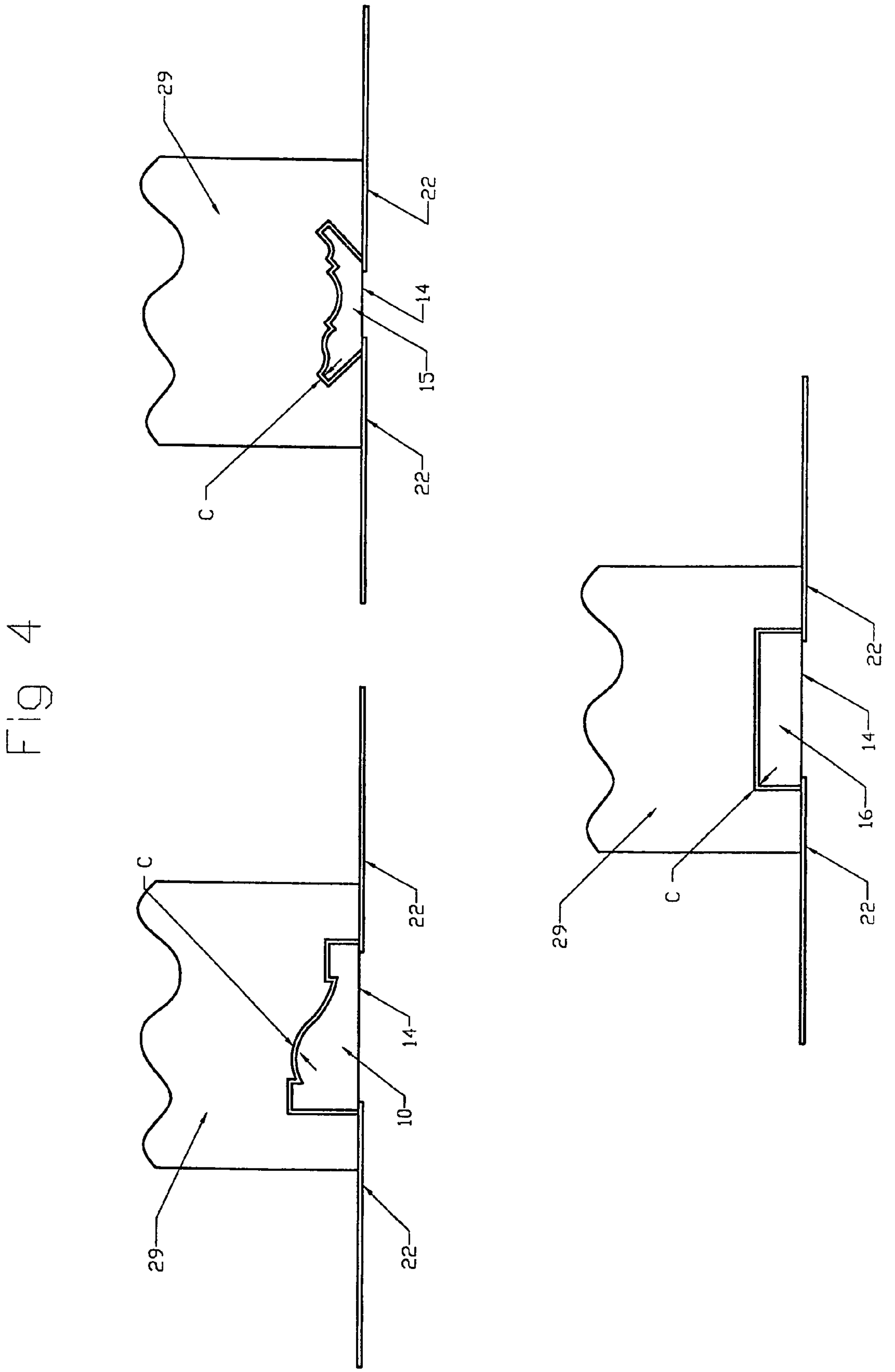
FIG. 4 is an end view looking at the different cores passing through the input template into the coating chamber. The clearance "C" between the template profile and the pre-formed core profile is illustrated.

Referring to FIG. 4, the core 10 passes through the input template 29, which is adjusted vertically to provide a clearance "C". The clearance "C" has to be enough so that the core does not catch on the template, as it is advanced forward.

Figure 3:
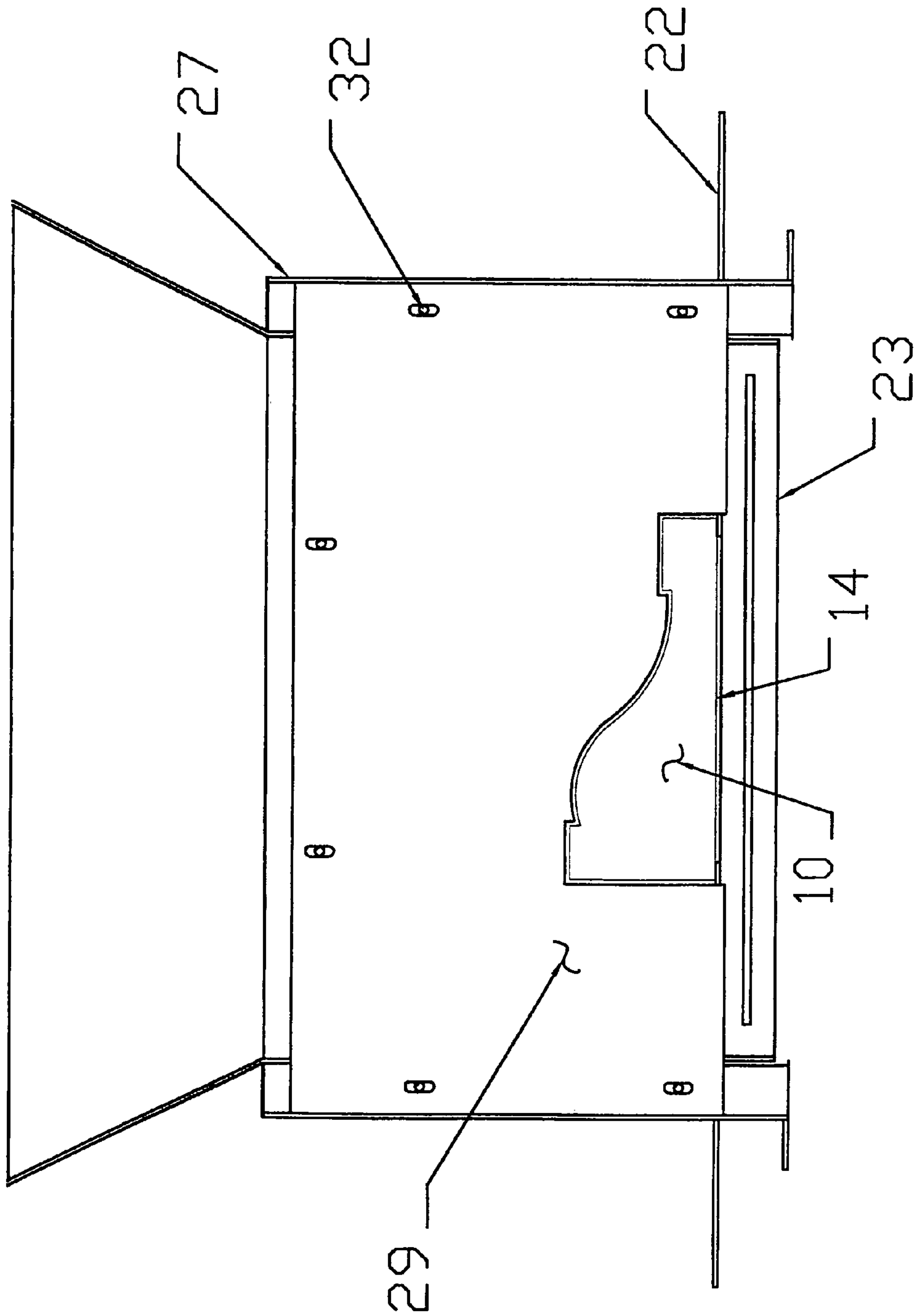
FIG. 3 is an end view looking at the core as it passes through the input template into the coating chamber.

Referring to FIG. 3, the bottom slide plate 22 that rests upon slide support 23 is adjusted laterally to support the core 10 as it passes through the coating chamber. Between the two slide plates 22 is an opening, leaving the core 10 unsupported. The unsupported section can be varied to provide sufficient support depending upon the cross sectional strength of the core. The opening allows the coating material to escape from the bottom of the coating chamber when the last moulding exits or if subsequent cores are not butted end to end close enough. This allows for easy cleanout when finished and also provides an escape for the material for unbutted cores.

Referring to FIG. 3, the input template 29 is held to the end wall 27 with screw knobs 32. The screw holes on the template are slotted to allow to vertical adjustment. The template 29 is made to extend below the surface of the slide plate 22, thus giving the flexibility of vertical adjustment without material escaping from between the template the slide plate.

Figure 5:
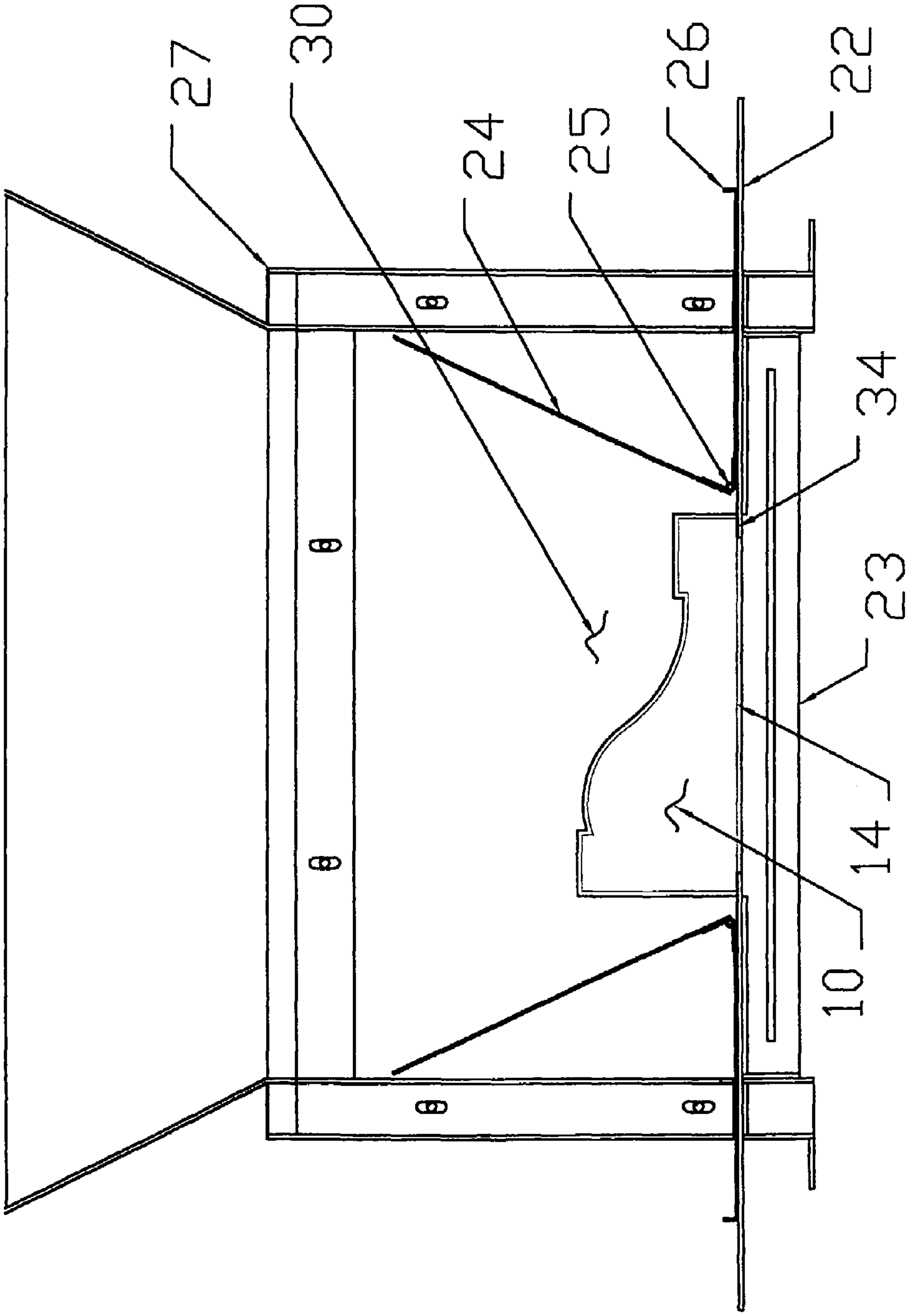
FIG. 5 is an end view of the core inside the coating chamber passing through the output template. Illustrated are the baffle plates, support plate, slide support, end walls and slide seal.

Referring to FIG. 5, the core 10 continues to advance through the coating chamber. The core 10 is supported on the bottom surface by the two laterally adjustable support plates 22, which extend approximately one-half inch under the bottom of the core. The core advances over the support plates 22 and creates a seal 34 along the bottom that prevents the coating material from escaping out the bottom of the coating chamber as long as a core 10 is present. By having a support plate extending under by only one-half inch, friction that would be encountered with a continuous supporting surface is greatly reduced.

Referring to FIG. 5, the core 10 advances between two opposing baffle plates 24, which are hinge 25 connected to the top of baffle slides 26. The baffle slides can be moved laterally which causes the baffle plates 24 to move closer or farther from the sides of the core 10. The top of the baffle plates 24 rest against the end walls 27. The result being that the coating material is funneled toward the core 10 without creating areas in the corners of the coating chamber where the material would not flow.

The core 10 is advanced so that the leading edge extends past the output template. At this point, and if this is the first core being coated, the coating chamber is filled with the coating material. The coating material is contained because the end walls 27, the input template 29, the output template 30, the baffle plates 24, the core 10 and the support plates 22 restricts its escape. Cores are then advanced through the apparatus one after the other butted end to end.

When the last core 10 passes through the coating chamber, the ledge seal 34 between the core 10 and support plates 22 no longer exists and the excess coating material is free to fall through into a collection pail.

Figure 6:
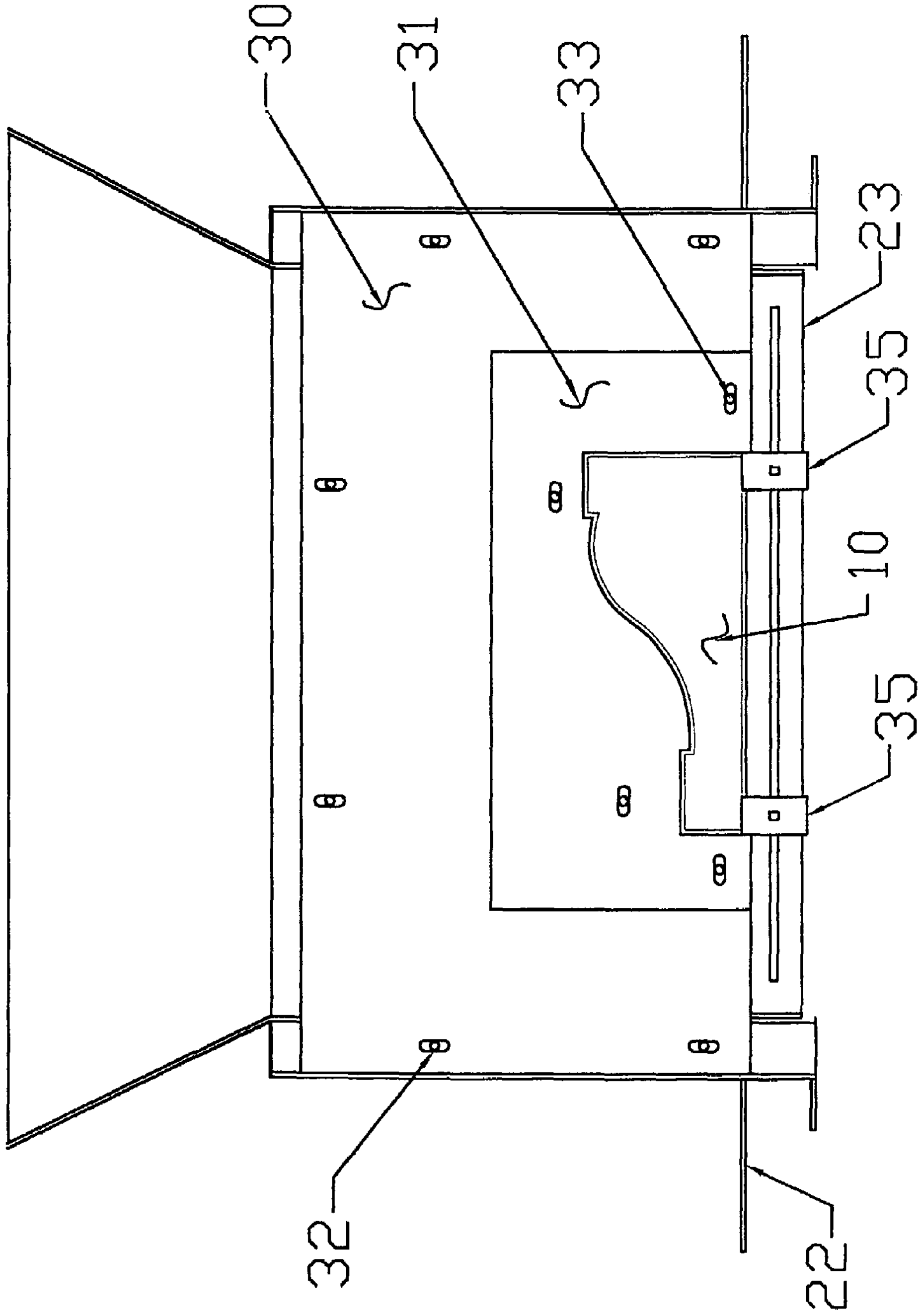
FIG. 6 is and end view looking at the core as it exits the coating chamber. Illustrated is the output template assembly and scrapers.

Referring to FIG. 6, the core 10 is exiting from the coating chamber through output template 30. Output template 30 is adjusted vertically to give a clearance between the core 10 and the profile that corresponds to the desired coating thickness. Additionally, a second template 31 with the exact same profile as the output template 30 is sandwiched over top the output template 30. The second template 31 is slotted and held to template 30 with screws 33. By sliding the second template 31 laterally, the opening profile size is reduced and varied to give the desired thickness of the coating. This adjustment also allows for setting the templates if the core 10 is smaller than expected. Scrapers 35 are positioned laterally and adjusted vertically to remove any material that may have squeezed under the bottom corners of the core 10.

Referring to FIG. 1, apparatus 100 can be physically sized to accommodate different size ranges of templates. This way smaller templates, up to eight inches wide will fit on a small coating chamber, eight inches to eighteen inches will fit on an intermediate sized coating chamber and eighteen inches to thirty-six inches will fit on a large coating chamber. This eliminates the situation where a four inch core is coated in a thirty-six inch coating chamber resulting in an inordinate amount of coating material required to fill the apparatus.

Templates of standard decorative shapes are catalogued and available to quickly attach to the coating chamber, giving the industry access to an unprecedented variety of shapes economically and quickly.

While many specific structural details have been disclosed, it will be understood that it is capable of many modifications and that this application is intended to cover any variation, uses, adaptions of the invention, following in general the principles of the invention including such departures from the present disclosure as to come within the knowledge of customary practice in the art, and as may be applied to the essential features hereinbefore set forth and falling within the scope of the invention or the limits of the appended claims.

What is claimed is:

1. An apparatus for applying a coating material to the surface of a plurality of elongate foam cores, said apparatus comprising:

means for providing a supporting bottom ledge which is adjustable for different core sizes and opened at the center, means for funneling the coating material toward the sides of said cores;

means for imparting a surface profile on the core surface by the use of a coating chamber with input and output templates to impart a surface profile on the surface of said cores and which are adjustable attached to said apparatus and which output template is horizontally adjustable; and a means for providing easy cleanout of said coating chamber.

2. An apparatus as claimed in claim 1 wherein said means for providing easy cleanout of said coating chamber is the opening at the center of said bottom ledge.

3. An apparatus as claimed in claim 1 wherein said means for funneling the coating material toward the sides of said cores is a pair of opposed baffle plates.

4. An apparatus as claimed in claim 3 wherein said pair of opposed baffle plates are hingedly connected to the top of a pair of laterally moveable baffled slides which control the movement of said baffle plates.

* * * * *